May 7, 1957 F. A. ROPER 2,791,352
MEASURING DISPENSING DEVICE
Filed July 7, 1954
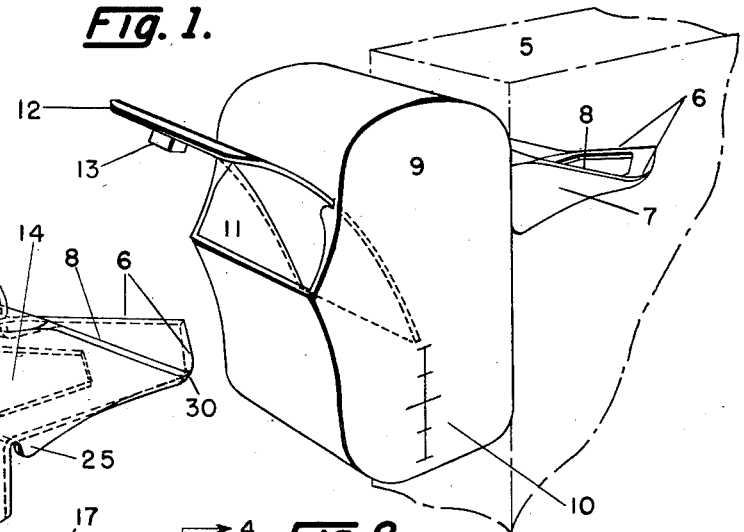
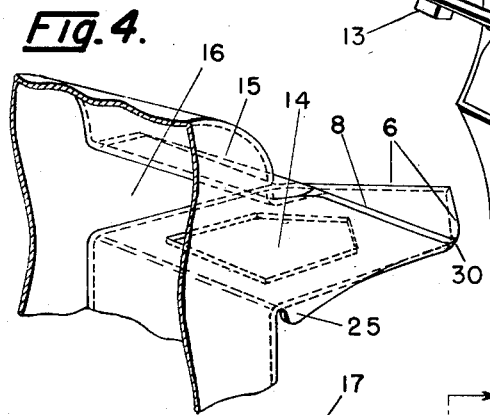
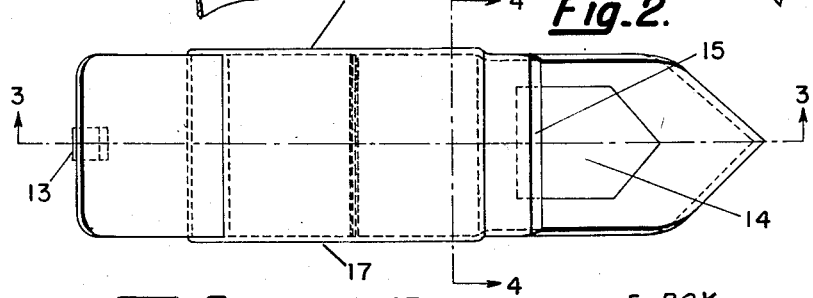
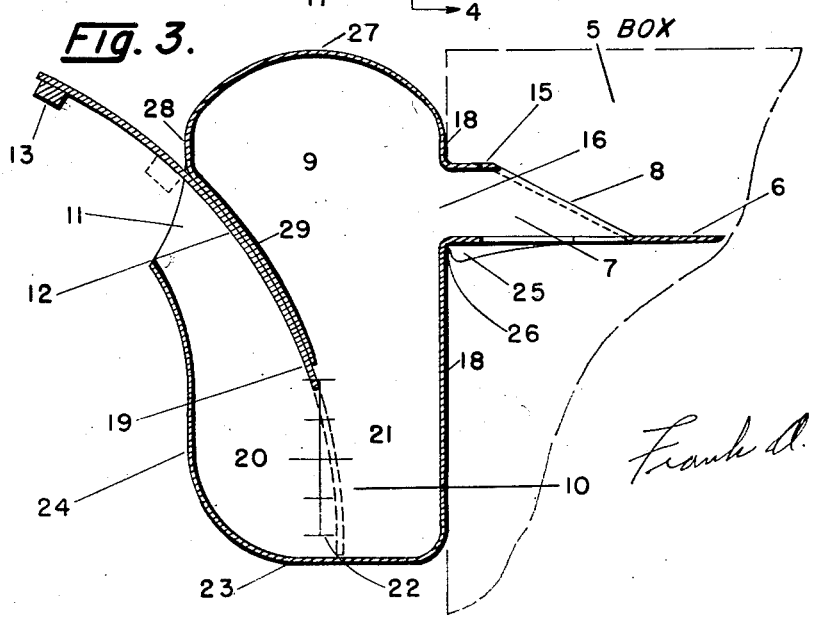
Frank A. Roper United States Patent Office 2,791,352
Patented May 7, 1957

2,791,352
MEASURING DISPENSING DEVICE
Frank Adams Roper, Westchester County, N. Y.
Application July 7, 1954, Serial No. 441,725
8 Claims. (Cl. 222—50)

This invention relates to measuring and dispensing devices and more particularly to a measuring and dispensing device adapted for attachment to containers of pulverulent, granular, flake-like or powdered materials as a means whereby the materials contained in the package may be readily measured and dispensed in variable quantities by merely tilting the container as it is during a normal pouring operation.

An object of the present invention is to provide a combination measuring and dispensing device for such above described materials that may easily and securely, yet releaseably be attached universally to all containers made of cardboard or similar materials normally used to package pulverulent, granular, flake-like or powdered materials, such as cereals, sugar, soaps, detergents, etc., regardless of the size or shape of the container, and further not requiring any pre-determined or prepared position for attachment.

Another object of the invention is to provide a measuring and dispensing device which affords its own means of effecting an opening through the wall of the container, the contents of which are to be dispensed in measured quantities. This opening device being part and parcel of this device.

Another object of the invention is to provide a measuring dispensing device for attachment to a container where said device is attached to said container so as to provide a leak-proof connection with the interior of said container and the interior of said device and through which connection, contents of said container may be discharged into said device.

Yet another object of the invention is to provide a measuring and dispensing device adapted for attachment to a container, said device including means for varying the measurement of the quantity of material to be discharged during each successive pouring (tilting) motion of the container to which it is attached.

A further object of the invention is to provide a measuring dispensing device adapted for attachment to a container, said device having operatively associated therewith means for effectively sealing the material in the carton and in the device itself, so as to preclude accidental or unintentional spillage of the contents in the container and in the device when the container on which the device is attached is accidentally upset.

A still further object of the invention is to provide a measuring and dispensing device having the above described characteristics, and being light in weight and inexpensive to produce, and lends itself readily to modern mass production manufacturing techniques.

These and other objects will be more obviously noticeable as the description continues in reference to the accompanying drawings in which:

Figure 1 is a perspective view of the dispensing and measuring device of the present invention indicating the general appearance of this device.

Figure 2 is a top view of my invention showing certain structural features.

Figure 3 is a vertical sectional view taken on line 3—3 of Figure 2, and presented as inserted in a partial section of a container.

Figure 4 is a sectional perspectus showing certain structural features of the part of this device which is inserted into a container.

Referring to the drawing in detail, the container in which the material to be dispensed is contained, is indicated by the reference character 5 and represents all sizes of cardboard or other non-metallic containers normally used for packaging pulverulent, granular, powdered or flake-like materials such as sugar, salt, soaps, detergents, dry cereals, flours and the like.

Looking at Figure 1, it will be noted that my invention has a pointed cutting edge 6 which tapers through an inclined plane 7 maintaining thereon a cutting edge 8 and joining cross member 15 (Figs. 2, 3 and 4) forming a conduit through which material may pass from container 5 into the dispensing device after the device is attached to a container 5 and the container is tilted as it is during a normal pouring motion.

Figure 2 shows an opening 14 through which materials flow from the container into this device when the container with the device attached is tilted as it is during a normal pouring operation. Ledge 15 acts as a wedge to assure that the cut-out flap of the container is held in a semi-horizontal position preventing this flap from interfering with the flow of material into the dispensing unit through opening 16 (Fig. 3) in the rear wall. Parallel spaced side walls are indicated by reference character 17.

Moving on to Figure 3, 16 indicates the opening in the rear wall 18 through which material from the container enters the upper chamber 9 of this device. It will be seen that when the container 5 has this device attached to it, and is tilted to 90 degrees or more, material from the container will flow through openings 14 and 16 and be stored in upper chamber 9. Returning the container to its normal upright position (indicated by Fig. 3), will allow material in chamber 9 to fall by gravity and fill chamber 10. On each successive tilting motion, the upper chamber 9 is reloaded and the lower measuring chamber discharges the measured quantity in chamber 10 as determined by adjustable separator 12 through spout 11. If adjustable separator 12 is in its full open position with the base at point 19 and chamber 10 is full of material to this point, measured amounts of lesser quantities than that represented by point 19 can still be obtained by depressing adjustable separator 12 to a point which would have the measurement desired since sections 20 and 21 of chamber 10 are in direct and equal relationship to each other. Measurement scale 22 is part and parcel of the device. 23 indicates the bottom section of the device and is upwardly inclined joining the front wall 24 and thence proceeding outwardly to form spout 11. Hooks 25 gradually taper from inclined vertical side 7 forwardly toward rear wall 18, thence sharply upwardly to form a sure hook over the cut edge of carton 5 at point 26. This hook connection is a releaseable connection when an upward and outward force is applied to the device. The top 27 is formed by a dome for design purposes and continues into a vertical section 28 and thence to the permanent separator 29. Movable separator 12 rides in grooved tracks in side walls 17 and when fully depressed variable separator joins bottom 23 substantially forming a seal therewith.

Finally, looking at Figure 4, it will be noted that forward cutting edges 6 join side cutting edges 8 through an inclined concave curve 30. In this figure, the relationship between opening 14 and 16 can more readily be appreciated along with the relationship of forward cutting edges 6, vertically sloped cutting edges 8 and wedge 15.

My device may be fabricated by all modern manufacturing methods, including mass production methods, such as injection moulding and may be made of plastic sheets, or powder, or from sheet metal or any other suitable substance having the desired characteristics.

What is claimed is:

1. Apparatus for measuring and dispensing solid particles from a container, comprising a box-like structure having an inlet opening and an outlet opening and an interior chamber connecting the two openings, a conduit extending around the inlet opening and projecting outwardly from the box-like structure, the end of said conduit nearest said chamber having a substantially regular cross-section so that it slides evenly and closely through a surrounding opening through a wall of a container, a pointed cutting edge on the conduit to facilitate pressing the conduit through a wall of a container to make such a surrounding opening therethrough, and a separator member mounted within the box-like structure and movable between a position in which it bisects and seals the chamber between the said inlet and outlet openings, and other positions in which it is capable of successively releasing solid particles from a container in amounts variably controlled by the position of the separator member.

2. Apparatus for measuring and dispensing solid particles from a container, comprising a box-like structure having an inlet opening and an outlet opening and an interior chamber connecting the two openings, a conduit extending around the inlet opening and projecting outwardly from the box-like structure, said conduit being shaped to be thrust through a wall of a container to open a passage between the inerior of the container and the chamber in said box-like structure, a separator member slidably mounted within the box-like structure and movable between a position in which it bisects and seals the chamber between the said inlet and outlet openings, and other positions in which it is capable of successively releasing solid particles from a container in amounts variably controlled by the position of the separator member, and means marking the position of the separator member in the box-like structure, whereby said controlled amounts may be predetermined.

3. Apparatus for measuring and dispensing solid particles from a container, comprising a box-like structure having an inlet opening and an outlet opening and an interior chamber connecting the two openings, separator means interrupting passage through said chamber between said openings so that controlled amounts of solid particles may be successively released from the container, and a conduit extending around the inlet opening and projecting outwardly from the box-like structure, the end of said conduit nearest said chamber having a substantially regular cross-section so that it slides evenly and closely through a surrounding opening through a wall of a container, a pointed cutting edge formed as an extension of one side of the conduit to facilitate pressing the conduit through a wall of a container to make such a surrounding opening therethrough, and said one side of the conduit having an opening therethrough for receiving solid particles from the interior of a container, whereby said cutting edge cuts straight into the wall of a container and leaves no flap-like portion of the container wall which might obstruct the latter opening.

4. Apparatus for measuring and dispensing solid particles from a container, comprising a box-like structure having an inlet opening and an outlet opening and an interior chamber connecting the two openings, a conduit extending around the inlet opening and projecting outwardly from the box-like structure, said conduit being shaped to be thrust through a wall of a container to open a passage between the interior of the container and the chamber in said box-like structure, a separator member slidably mounted within the box-like structure and movable between a position in which it bisects and seals the chamber between the said inlet and outlet openings, and other positions in which it is capable of successively releasing solid particles from a container in amounts variably controlled by the position of the separator member, said separator member being mounted to slide through the outlet opening of the box-like structure, and means marking the position of the separator member in the box-like structure, whereby said controlled amounts may be predetermined.

5. Apparatus for measuring and dispensing solid particles from a container, comprising a box-like structure having an inlet opening and an outlet opening on opposite sides of the structure and an interior chamber connecting the two openings, a conduit extending around the inlet opening and projecting outwardly from the box-like structure, said conduit being shaped to be thrust through a wall of a container to open a passage between the interior of the container and the chamber in said box-like structure, a separator member slidably mounted within the box-like structure and movable between a position in which it bisects and seals the chamber between the said inlet and outlet openings, and other positions in which it is capable of successively releasing solid particles from a container in amounts variably controlled by the position of the separator member, said separator member being curved semi-cylindrically, and said box-like structure including guide means which slidably receive curved side edges of the separator member, said guide means being positioned to cause the upper end of the separator member to be slidable out of the box-like structure through the top portion of the outlet opening, and means marking the position of the separator member in the box-like structure, whereby said controlled amounts may be predetermined.

6. Apparatus for measuring and dispensing solid particles from a container, comprising a box-like structure having an inlet opening and an outlet opening and an interior chamber connecting the two openings, a conduit extending around the inlet opening and projecting outwardly from the box-like structure, said conduit being shaped to be thrust through a wall of a container to open a passage between the interior of the container and the chamber in said box-like structure, a separator member slidably mounted within the box-like structure and movable between a position in which it bisects and seals the chamber between the said inlet and outlet openings, and other positions in which it is capable of successively releasing solid particles from a container in amounts variably controlled by the position of the separator member, hook means projecting outwardly from a side of the said conduit, in position to hook over the edge of an opening made in a container wall by the conduit and thus to hold the box-like structure against the container wall, and means marking the position of the separator member in the box-like structure, whereby said controlled amounts may be predetermined.

7. Apparatus for measuring and dispensing solid particles from a container, comprising a box-like structure having an inlet opening and an outlet opening and an interior chamber connecting the two openings, separator means interrupting passage through said chamber between said openings so that controlled amounts of solid particles may be successively released from the container, a conduit extending around the inlet opening and projecting outwardly from the box-like structure, the end of said conduit nearest said chamber having a substantially regular cross-section so that it slides evenly and closely through a surrounding opening through a wall of a container, a pointed cutting edge formed as an extension of one side of the conduit to facilitate pressing the conduit through a wall of a container to make such a surrounding opening therethrough, and said one side of the conduit having an opening therethrough for receiving solid particles from the interior of a container, whereby said cutting edge cuts straight into the wall of a container and leaves no flap-like portion of the container wall which might obstruct the latter opening, and hook means projecting from a side of said conduit in position to hook over the edge of an opening made in a container wall and thus to hold the box-like structure against the container wall.

8. Apparatus for measuring and dispensing solid particles from a container, comprising a box-like structure having an inlet opening and an outlet opening and an interior chamber connecting the two openings, separator means interrupting passage through said chamber between said openings so that controlled amounts of solid particles may be successively released from the container, a conduit extending around the inlet opening and projecting outwardly from the box-like structure, the end of said conduit nearest said chamber having a substantially regular cross-section so that it slides evenly and closely through a surrounding opening through a wall of a container, a pointed cutting edge formed as an extension of one side of the conduit to facilitate pressing the conduit through a wall of a container to make such a surrounding opening therethrough, and said one side of the conduit having an opening therethrough for receiving solid particles from the interior of a container, whereby said cutting edge cuts straight into the wall of a container and leaves no flap-like portion of the container wall which might obstruct the latter opening, and a wall extending transversely across the conduit to form the terminal end of the passage through the conduit, and other walls intersecting said transverse wall to form sharp corners for purposes of cutting into container walls.

References Cited in the file of this patent

UNITED STATES PATENTS

| | | |
|---|---|---|
| 2,107,654 | Vail | Feb. 8, 1938 |
| 2,243,452 | Bickel et al. | May 27, 1941 |
| 2,523,426 | Gray | Sept. 26, 1950 |